US012656712B2

(12) United States Patent
Nishimura

(10) Patent No.: US 12,656,712 B2
(45) Date of Patent: Jun. 16, 2026

(54) IMAGE FORMING APPARATUS

(71) Applicant: SHARP KABUSHIKI KAISHA, Sakai City (JP)

(72) Inventor: Toshiki Nishimura, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/829,744

(22) Filed: Sep. 10, 2024

(65) Prior Publication Data

US 2025/0085655 A1 Mar. 13, 2025

(30) Foreign Application Priority Data

Sep. 13, 2023 (JP) ................................ 2023-148538

(51) Int. Cl.
*G03G 15/00* (2006.01)
*G03G 15/01* (2006.01)
*G03G 15/16* (2006.01)
*G03G 15/20* (2006.01)

(52) U.S. Cl.
CPC ..... *G03G 15/5004* (2013.01); *G03G 15/0131* (2013.01); *G03G 15/0189* (2013.01); *G03G 15/1605* (2013.01); *G03G 15/2064* (2013.01); *G03G 15/6594* (2013.01); *G03G 2215/00632* (2013.01)

(58) Field of Classification Search
CPC ........... G03G 15/1675; G03G 15/6594; G03G 15/5029; G03G 15/1665; G03G 15/657
See application file for complete search history.

(56) References Cited

U.S. PATENT DOCUMENTS

2015/0071667 A1 3/2015 Hiroki et al.
2021/0333728 A1* 10/2021 Nagata ............... G03G 15/5012

FOREIGN PATENT DOCUMENTS

JP 10097147 A * 4/1998 ............ G03G 15/16
JP 4521939 B2 * 8/2010
JP 2015-055678 A 3/2015

OTHER PUBLICATIONS

English text translation of JP_10097147.*
English text translation of JP_4521939.*

* cited by examiner

*Primary Examiner* — Arlene Heredia Ocasio
(74) *Attorney, Agent, or Firm* — ScienBiziP, P.C.

(57) ABSTRACT

An image forming apparatus including a transferer, a fixer, and a controller, is provided. The transferer transfers a toner image on an image carrier onto a sheet. The fixer fixes the toner image on the sheet. The controller applies transfer voltage for transferring the toner image onto the sheet. The transferer defines a transfer nip for passing the sheet between the image carrier and the transferer. The fixer includes a heating portion and a pressing portion, and passes the sheet after passing through the transfer nip through a fixing nip between the heating portion and the pressing portion. The controller controls the transfer voltage such that transfer current flowing through the transfer nip is made constant at a setting value, and increases the setting value of transfer current after a leading end of the sheet passes through the transfer nip and immediately before it enters the fixing nip.

9 Claims, 5 Drawing Sheets

IMAGE FORMING APPARATUS

CROSS-REFERENCE TO RELATED APPLICATION

The present application claims priority from Japanese Application JP2023-148538, the content of which is hereby incorporated by reference into this application.

BACKGROUND

1. Field

The present disclosure relates to an image forming apparatus.

2. Description of the Related Art

Conventionally, it has been known that when an impact caused when a sheet enters a fixer is conveyed to the sheet and reaches a transferer, a toner image being transferred is disturbed, and image quality is deteriorated. In addition, as is conventionally known, it is possible to suppress propagation of the impact which may cause deterioration in image quality as described above by bending the sheet between the transferer and the fixer.

SUMMARY

However, in a case where an image is printed on thick paper, there is a case that propagation of the impact cannot be suppressed, even when the thick paper is bent because the thick paper is hard. Further, the impact caused when the thick paper enters the fixer is large, as compared with plain paper.

The present disclosure has been made in view of the above circumstances, and provides an image forming apparatus capable of suppressing deterioration in image quality caused when a leading end of a sheet passes through a fixing nip.

An image forming apparatus according to an aspect of the present disclosure includes: a transferer provided to transfer a toner image on an image carrier onto a sheet, and facing the image carrier; a fixer provided to fix the toner image on the sheet; and a controller provided to apply transfer voltage for transferring the toner image onto the sheet. The transferer is provided to define a transfer nip for passing the sheet between the image carrier and the transferer. The fixer includes a heating portion and a pressing portion, and is provided to pass the sheet that has passed through the transfer nip through a fixing nip between the heating portion and the pressing portion. The controller is provided to control the transfer voltage in such a way that transfer current flowing through the transfer nip is made constant at a setting value, and is provided to increase the setting value of transfer current after a leading end of the sheet passes through the transfer nip and before the leading end of the sheet passes through the fixing nip.

According to the present disclosure, it is possible to suppress deterioration in image quality caused when a leading end of a sheet passes through a fixing nip.

DESCRIPTION OF EMBODIMENTS

Figure 1:
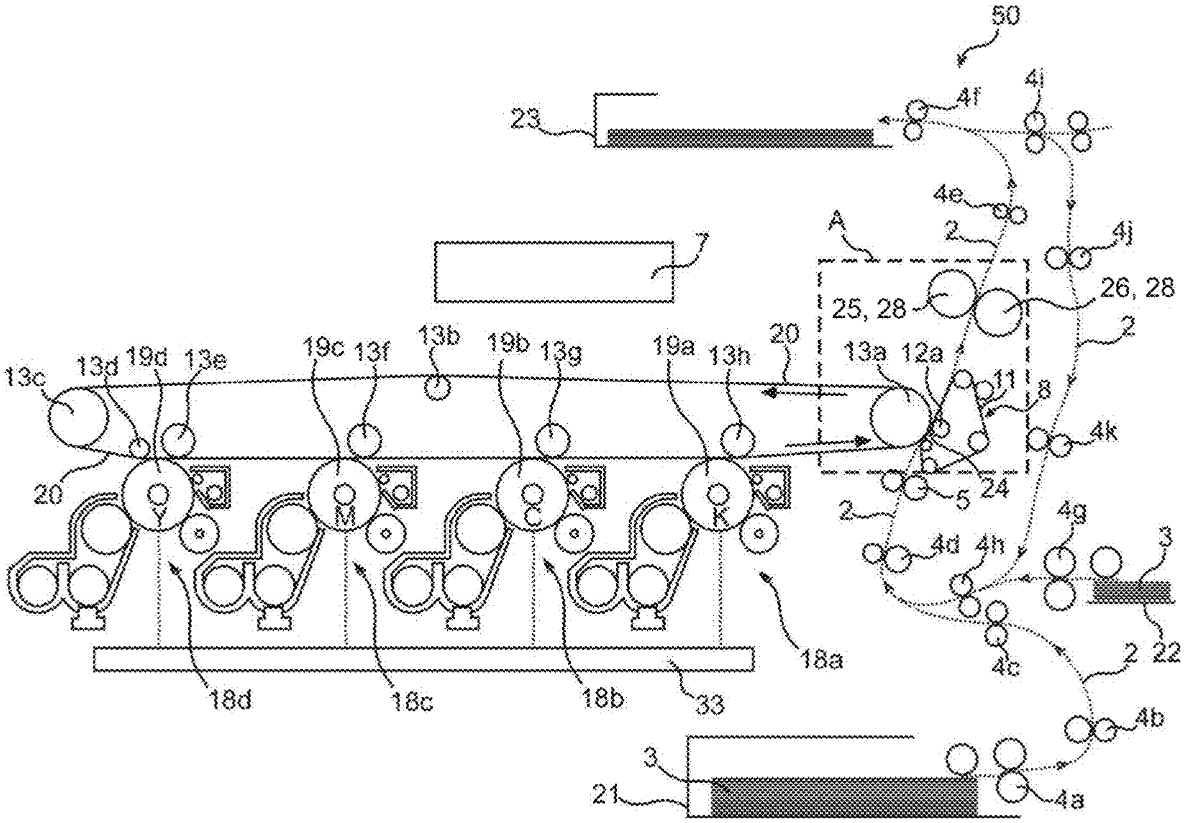
FIG. 1 is a schematic diagram illustrating a configuration of an image forming apparatus according to an embodiment of the present disclosure.

An image forming apparatus according to the present disclosure includes: a transferer that transfers a toner image on an image carrier onto a sheet, and facing the image carrier; a fixer that fixes the toner image on the sheet; and a controller that applies transfer voltage for transferring the toner image onto the sheet. The transferer defines a transfer nip for passing the sheet between the image carrier and the transferer. The fixer includes a rotatable heating portion and a rotatable pressing portion, and passes the sheet that has passed through the transfer nip through a fixing nip between the heating portion and the pressing portion. The controller controls the transfer voltage in such a way that transfer current flowing through the transfer nip is made constant at a setting value, and increases the setting value of transfer current after a leading end of the sheet passes through the transfer nip and before the leading end of the sheet passes through the fixing nip.

Preferably, the controller may increase the setting value of transfer current after the leading end of the sheet passes through the transfer nip and before the leading end of the sheet passes through the fixing nip, and decrease the setting value of transfer current after the leading end of the sheet that has passes through the transfer nip passes through the fixing nip. Preferably, a transport distance of the sheet from an increase in the setting value of transfer current to a decrease in the setting value of transfer current may be 13 mm or more and 30 mm or less.

Preferably, the controller may determine whether to increase the setting value of transfer current after the leading end of the sheet passes through the transfer nip and before the leading end of the sheet passes through the fixing nip, based on a type of the sheet passing through the transfer nip. Preferably, in a case where the sheet is plain paper, the controller may make the setting value of transfer current constant while the sheet passes through the transfer nip, and in a case where the sheet is thick paper, the controller may increase the setting value of transfer current after the leading end of the sheet passes through the transfer nip and before the leading end of the sheet passes through the fixing nip.

Preferably, the controller may determine whether to increase the setting value of transfer current after the leading end of the sheet passes through the transfer nip and before the leading end of the sheet passes through the fixing nip, based on an electrical resistance value between a front surface and a back surface of the sheet. Preferably, the image forming apparatus may further include a sensor section that measures an electrical resistance value between a front surface and a back surface of the sheet, and the controller may determine whether to increase the setting value of transfer current after the leading end of the sheet passes through the transfer nip and before the leading end of the sheet passes through the fixing nip, based on an electrical resistance value measured by the sensor section. Preferably, the controller may make the setting value of transfer current constant while the sheet passes through the transfer nip, in a case where a toner image being a text is transferred onto the sheet in the transfer nip at timing when the leading end of the sheet passes through the fixing nip, and the controller may increase the setting value of transfer current after the leading end of the sheet passes through the transfer nip and before the leading end of the sheet passes through the fixing nip, in a case where a toner image being an image is transferred onto the sheet in the transfer nip at timing when the leading end of the sheet passes through the fixing nip.

Preferably, the controller may increase the setting value of transfer current after the leading end of the sheet passes through the transfer nip and before the leading end of the sheet passes through the fixing nip, in a case where an amount of cyan toner or yellow toner contained in a toner image to be transferred onto the sheet in the transfer nip is larger than a predetermined value at timing when the leading end of the sheet passes through the fixing nip. Preferably, the controller may adjust an amount of increase in the setting value of transfer current, based on a type of the sheet passing through the transfer nip, an electrical resistance value between a front surface and a back surface of the sheet, or an amount of cyan toner or yellow toner contained in a toner image to be transferred onto the sheet in the transfer nip at timing when the leading end of the sheet passes through the fixing nip.

Hereinafter, an embodiment of the present disclosure is described by using the drawings. Drawings and configurations described in the following description are an example, and the scope of the present disclosure is not limited to the drawings and configurations described in the following description.

Figure 2:
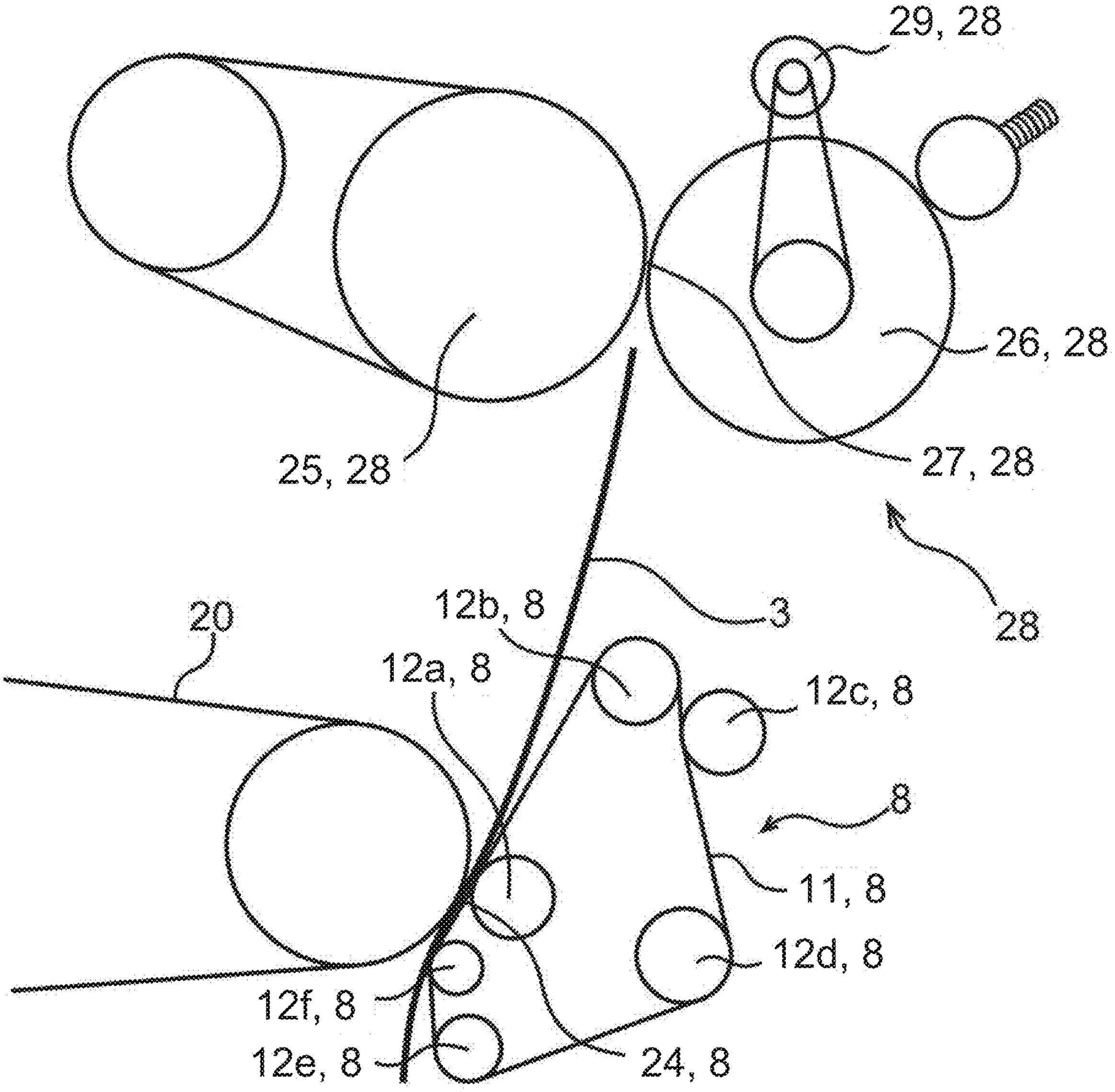
FIG. 2 is an enlarged view of an area A surrounded by a broken line in FIG. 1.

FIG. 1 is a schematic diagram illustrating a configuration of an image forming apparatus according to the present embodiment, and FIG. 2 is an enlarged view of an area A surrounded by a broken line in FIG. 1.

An image forming apparatus 50 according to the present embodiment includes: a transferer 8 provided in such a way as to transfer a toner image on an image carrier 20 onto a sheet 3, and facing the image carrier 20; a fixer 28 provided in such a way as to fix the toner image on the sheet 3; and a controller 7 provided in such a way as to apply transfer voltage for transferring the toner image onto the sheet 3. The transferer 8 is provided in such a way as to define a transfer nip 24 for passing the sheet 3 between the image carrier 20 and the transferer 8. The fixer 28 includes a rotatable heating portion 25 and a rotatable pressing portion 26, and is provided in such a way as to pass the sheet 3 that has passed through the transfer nip 24 through a fixing nip 27 between the heating portion 25 and the pressing portion 26. The controller 7 is provided in such a way as to control the transfer voltage in such a way that transfer current flowing through the transfer nip 24 is made constant at a setting value, and is provided in such a way as to increase the setting value of transfer current after a leading end of the sheet 3 passes through the transfer nip 24 and before the leading end of the sheet 3 passes through the fixing nip 27.

The image forming apparatus 50 is an image forming apparatus of an electrophotographic method that forms an image by using an electrophotographic technique. The image forming apparatus 50 may be a monochromatic image forming apparatus capable of forming a monochromatic image, or may be a color image forming apparatus of an intermediate transfer method capable of forming a color image as illustrated in FIG. 1. The image forming apparatus 50 is, for example, a full color image forming apparatus of a so-called tandem type having a configuration in which a toner image former 18*a* that forms a toner image of black toner, a toner image former 18*b* that forms a toner image of cyan toner, a toner image former 18*c* that forms a toner image of magenta toner, and a toner image former 18*d* that forms a toner image of yellow toner are arranged side by side in a predetermined direction (e.g., a horizontal direction or a vertical direction). Further, the image forming apparatus 50 may be another color image forming apparatus, copying machine, multifunction peripheral, or facsimile device. The image carrier 20 is a member having a surface on which a toner image is formed, and is a member that defines the transfer nip 24 for passing the sheet 3 in cooperation with the transferer 8. In a case where the image forming apparatus 50 is a full color image forming apparatus, the image carrier 20 is an intermediate transfer belt 20. Further, in a case where the image forming apparatus 50 is a monochromatic image forming apparatus, the image carrier is a photoconductor.

The controller 7 is a portion that controls the image forming apparatus 50. The controller 7 may include, for example, an arithmetic processing device (e.g., a CPU), a RAM, a storage device (e.g., an HDD), a network controller, a video controller, a power supply portion, and the like. Further, the controller 7 is provided in such a way as to apply transfer voltage between an intermediate transfer belt roller 13*a* and the transferer 8. By applying the transfer voltage, transfer current is allowed to flow through the transfer nip 24, and a toner image on the intermediate transfer belt 20 (image carrier) can be transferred onto the sheet 3. Further, the controller 7 is provided in such a way as to control transfer voltage in such a way that transfer current flowing through the transfer nip 24 (the direction in which current flows is constant) is made constant at a setting value (constant current control). Further, the controller 7 is provided in such a way that the setting value of transfer current can be changed while the sheet 3 passes through the transfer nip 24. Further, the controller 7 can control transport, transfer timing, and the like of the sheet 3 on a sheet transport path 2 by controlling rotation of transport rollers 4*a* to 4*k*, registration rollers 5, the pressing portion 26, intermediate transfer belt rollers 13*a* to 13*h*, transferer rollers 12*a* to 12*f*, and the like.

The toner image formers 18*a* to 18*d* include photoconductors 19*a* to 19*d*, chargers, an exposure unit 33, developing units, transfer means, and cleaning units. The photoconductors 19*a* to 19*d* are members having a surface on which a latent image and a toner image are formed. By rotating the photoconductors 19*a* to 19*d*, a toner image of black toner, a toner image of cyan toner, a toner image of magenta toner, or a toner image of yellow toner is successively formed based on image data. The photoconductors 19*a* to 19*d* are, for example, a photosensitive drum. The charger, the exposure unit 33, the developing unit, the transfer means, and the cleaning unit are provided in this order from upstream toward downstream in the rotating direction of the photoconductors 19*a* to 19*d* along an outer peripheral surface of the photoconductors 19*a* to 19*d*. Toner may be negatively charged, or may be positively charged.

A toner image of black toner, a toner image of cyan toner, a toner image of magenta toner, and a toner image of yellow toner formed on the photoconductors 19*a* to 19*d* are transferred to the intermediate transfer belt 20 by Coulomb force or the like due to a primary transfer electric field (primary transfer), and are superimposed one over another. Thus, a color toner image is formed on the intermediate transfer belt 20. The color toner image on the intermediate transfer belt 20 being driven by the intermediate transfer belt rollers 13*a* to 13*h* is transferred onto the sheet 3 being transported on the sheet transport path 2 by Coulomb force or the like due to a secondary transfer electric field generated by transfer voltage in the transferer 8 (secondary transfer).

The transferer 8 is a portion provided in such a way as to transfer a toner image on the intermediate transfer belt 20 (image carrier) onto the sheet 3. The transferer 8 may be a transfer roller, or as illustrated in FIGS. 1 and 2, may have a configuration in which a transfer belt 11 is driven and rotated by the transferer rollers 12*a* to 12*f*. The transferer 8 is provided in such a way that the sheet 3 passes through the transfer nip 24 between the intermediate transfer belt 20 (image carrier) and the transferer 8. Further, the transferer 8 is electrically connected to the controller 7 in such a way as to apply secondary transfer voltage (voltage at which current flows in one direction) between the intermediate transfer belt roller 13*a* and the transferer 8. A secondary transfer electric field is formed by the secondary transfer voltage, and transfer current flows through the transfer nip 24. For example, secondary transfer voltage can be applied by connecting the intermediate transfer belt roller 13*a* to the ground, and controlling electric potential of the transferer 8 by the controller 7. Further, the secondary transfer voltage is controlled by the controller 7 in such a way that transfer current flowing through the transfer nip 24 is made constant at a setting value (constant current control).

A sheet transport device is a device that transports a sheet along the sheet transport path 2. The sheet transport device can include the sheet transport path 2, the transport rollers 4*a* to 4*k*, the registration rollers 5, the transferer 8, the fixer 28, a sheet feeding tray 21, a manual feed tray 22, a sheet discharge tray 23, and the like. Further, the sheet transport device can include a plurality of sheet sensors. Sheet transport by the sheet transport device is controlled by a control signal to be transmitted from the controller 7 to a motor that rotates each roller. Further, the sheet transport device can include a sensor section provided in such a way as to measure an electrical resistance value (penetrating electrical resistance value) between a front surface and a back surface of the sheet 3.

The sheet transport device is provided in such a way as to pick up the sheet 3 from the sheet feeding tray 21 or the manual feed tray 22, a color toner image on the intermediate transfer belt 20 is transferred onto the sheet 3 in the transferer 8, the color toner image is fixed on the sheet 3 in the fixer 28, and the sheet 3 having the color toner image is discharged to the sheet discharge tray.

The fixer 28 includes the rotatable heating portion 25, the rotatable pressing portion 26, and a fixer motor 29 provided in such a way as to rotate the heating portion 25 and the pressing portion 26, and is provided in such a way that the sheet 3 that has passed through the transfer nip 24 passes through the fixing nip 27 between the heating portion 25 and the pressing portion 26.

The fixer motor 29 is a motor provided in such a way as to drive one of the heating portion 25 and the pressing portion 26. In FIG. 2, the motor 29 is provided in such a way as to drive the pressing portion 26. Since the pressing portion 26 and the heating portion 25 are in contact with each other in the fixing nip 27 (when the sheet 3 is not passing), when the motor 29 is rotated to drive the pressing portion 26, the heating portion 25 is also rotated by the rotation of the motor 29. Therefore, the rotation of the heating portion 25 becomes opposite to the rotation of the pressing portion 26, and the fixer 28 can pass the sheet 3 that has entered the fixing nip 27 through the fixing nip 27, and transport the sheet 3. The controller 7 controls a sheet transport speed of the fixer 28 by controlling rotation of the motor 29 by using a control signal.

The heating portion 25 is a portion for heating a toner image on the sheet 3 passing through the fixing nip 27, and the pressing portion 26 is a portion for applying pressure to the sheet 3 passing through the fixing nip 27. Allowing the fixer 28 to include the heating portion 25 and the pressing portion 26 enables to fix a toner image on the sheet 3 by fusing and pressing the toner image. The heating portion 25 may be a heating roller or may be a heating belt, or may include a configuration in which a roller and a belt are combined. The pressing portion 26 may be a pressing roller, or may be a pressing belt.

The controller 7 is provided in such a way as to make a setting value of transfer current larger than a normal value after a leading end of the sheet 3 passes through the transfer nip 24 and before the leading end of the sheet 3 passes through the fixing nip 27. Further, the controller 7 can make a setting value of transfer current constant after making the setting value of transfer current larger than the normal value and while the leading end of the sheet 3 passes through the fixing nip 27. This enables to suppress deterioration in image quality caused when the leading end of the sheet 3 passes through the fixing nip 27. A reason for this is not clear, but it is conceived that electric field strength of a secondary transfer electric field increases by increasing transfer current, and even when an impact caused when the leading end of the sheet 3 enters the fixing nip 27 is conveyed to the sheet 3 and reaches the transfer nip 24, generation of disturbance in transfer of a toner image onto the sheet 3 is suppressed. The normal value of the setting value of transfer current is, for example, 50 μA or more and 120 μA or less. The normal value is a setting value of transfer current to be set when transfer of a toner image onto the sheet 3 is started. The normal value of the setting value of transfer current can be changed depending on a type o the sheet 3 passing through the transfer nip 24. An amount of increase in the setting value of transfer current is, for example, 20 μA or more and 120 μA or less.

The controller 7 may be provided in such a way as to increase the setting value of transfer current after the leading end of the sheet 3 passes through the transfer nip 24 and before the leading end of the sheet 3 passes through the fixing nip 27, and to decrease the setting value of transfer current after the leading end of the sheet 3 passing through the transfer nip 24 passes through the fixing nip 27. This enables to suppress occurrence of voids, white spots, and the like in a printed image.

FIGS. 3 to 6 are graphs illustrating a change in the setting value of transfer current. In these graphs, the horizontal axis represents a moving distance [mm] of the sheet 3 in a case where the position of the sheet 3 when the leading end of the sheet 3 enters the transfer nip 24 is set to 0 mm, and the vertical axis represents a setting value of transfer current flowing through the transfer nip 24. Further, in this example, a width of the transfer nip 24 is approximately 20 mm, and a width of the fixing nip 27 is approximately 13 mm.

Figure 3:
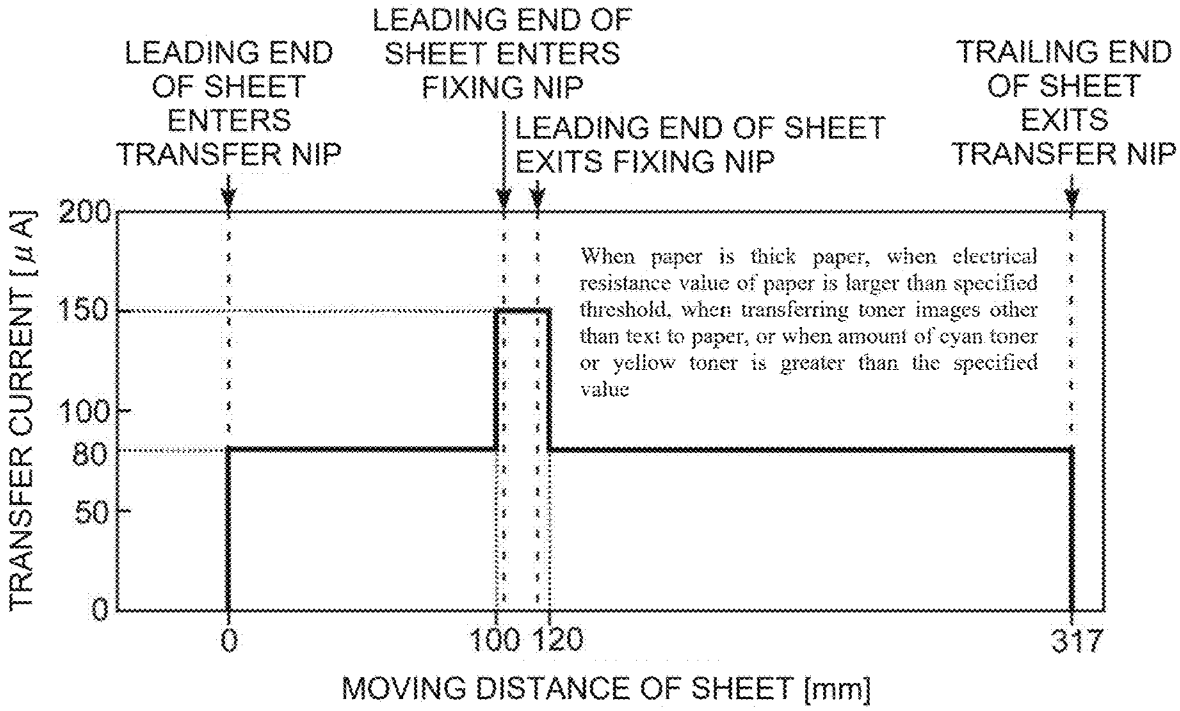
FIG. 3 is a graph illustrating a change in a setting value of transfer current.

Herein, control of transfer current by the controller 7 at the time of printing on thick paper (sheet 3) is described by using FIG. 3. In addition, as a comparative example, control of a transfer current, performed by the controller 7, at the time of printing on a plain paper (sheet 3) is described by using FIG. 7. The controller 7 starts applying transfer voltage at timing when the leading end of the sheet 3 (thick paper) enters the transfer nip 24, and performs constant current control by setting the setting value of transfer current to 80 μA (normal value). Then, the controller 7 sets the setting value of transfer current to 150 μA immediately before the leading end of the sheet 3 enters the fixing nip 27, and maintains the setting value of transfer current at 150 μA until the leading end of the sheet 3 exits the fixing nip 27. The controller 7 returns the setting value of transfer current to 80 μA (normal value) after the leading end of the sheet 3 exits the fixing nip 27. Further, the controller 7 stops applying transfer voltage at timing when a trailing end of the sheet 3 exits the transfer nip 24. Changing the setting value of transfer current in this way enables to suppress deterioration in image quality caused when the leading end of the sheet 3 passes through the fixing nip 27, and enables to suppress occurrence of voids, white spots, and the like in a printed image.

Figure 4:
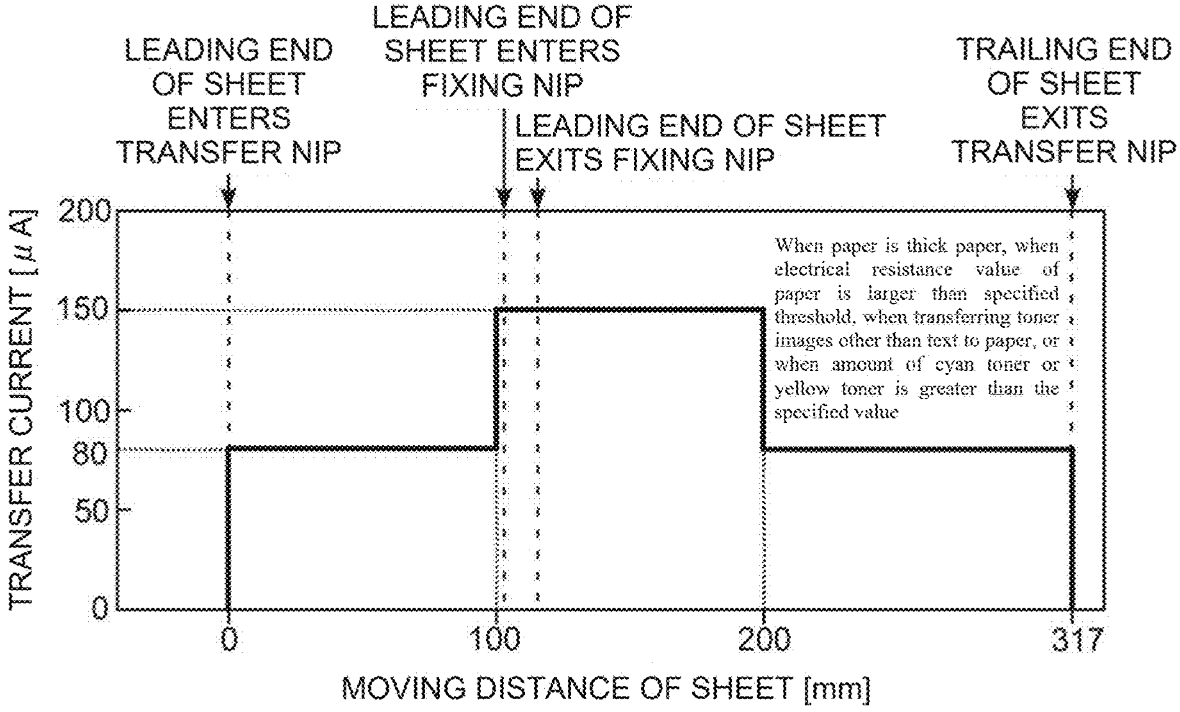
FIG. 4 is a graph illustrating a change in a setting value of transfer current.
Figure 5:
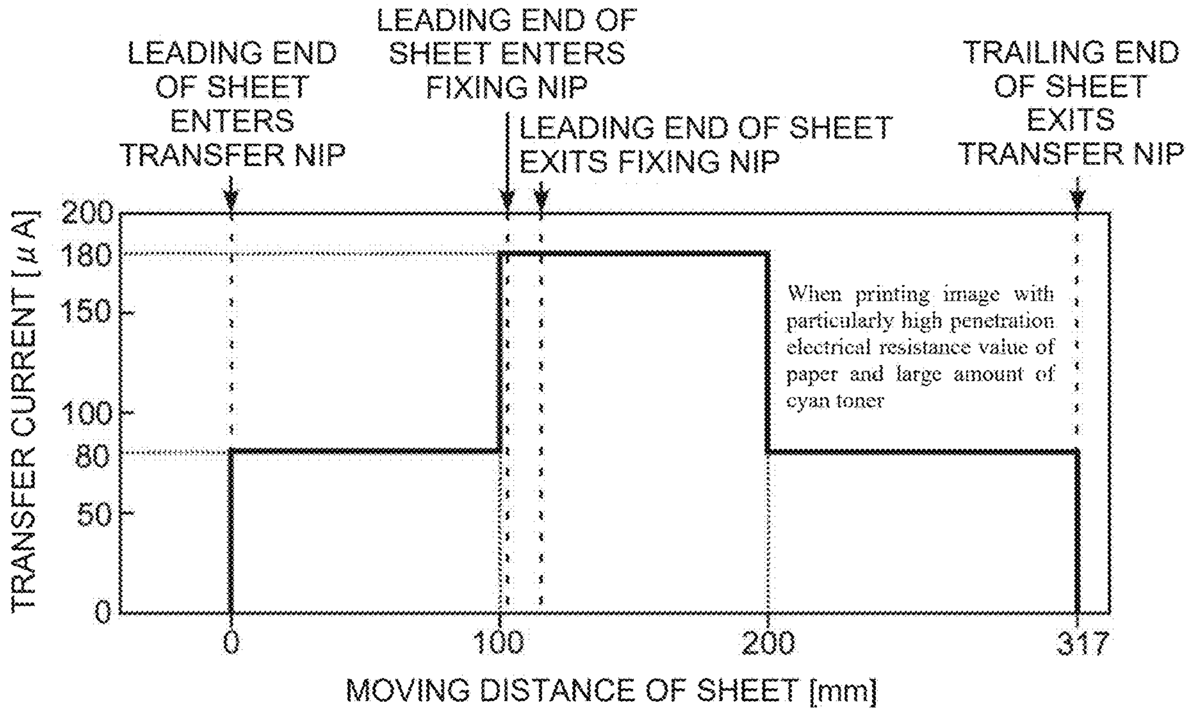
FIG. 5 is a graph illustrating a change in a setting value of transfer current.
Figure 6:
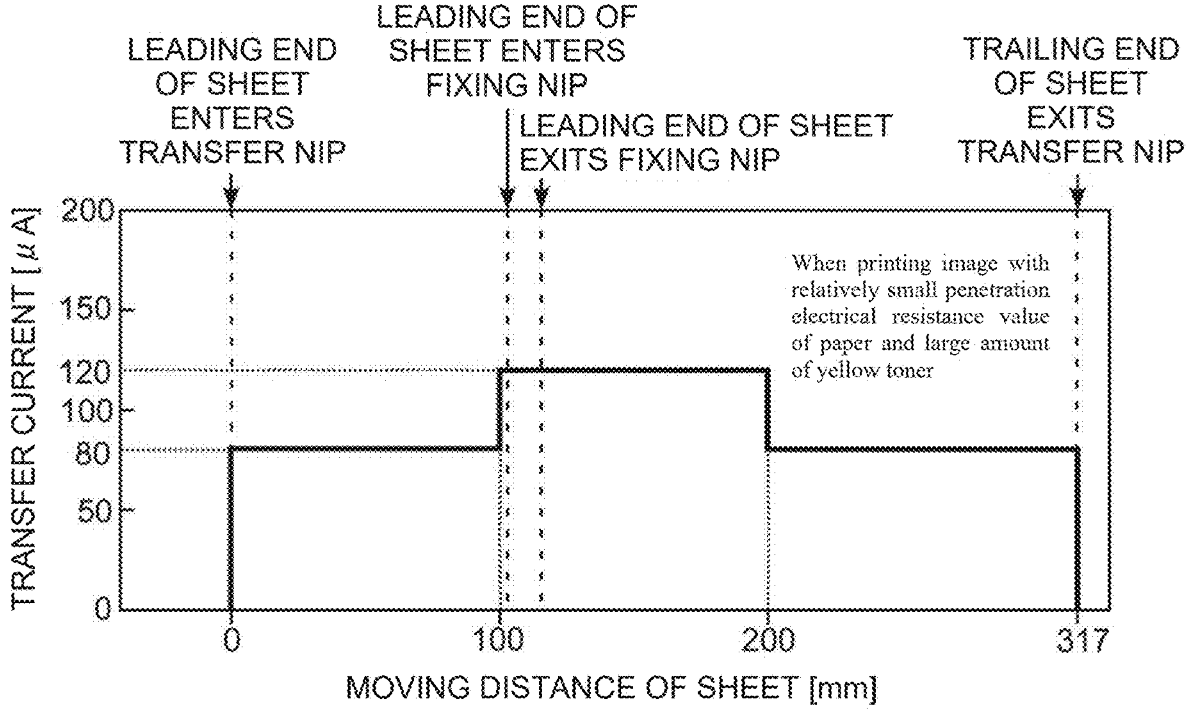
FIG. 6 is a graph illustrating a change in a setting value of transfer current.

Timing when the controller 7 returns the setting value of transfer current to the normal value after the leading end of the sheet 3 exits the fixing nip 27 is not particularly limited, as long as the timing is after the leading end of the sheet 3 exits the fixing nip 27. For example, in the graphs illustrated in FIGS. 4 to 6, the controller 7 returns the setting value of transfer current to the normal value, when the moving distance of the sheet 3 reaches 200 mm. Each of FIGS. 4 to 6 shows control of a transfer current by the controller 7 when printing on a thick paper (sheet 3). The transport distance of the sheet 3 during a time period after increasing the setting value of transfer current from the normal value until the setting value of transfer current is returned to the normal value is, for example, 13 mm or more and 30 mm or less. Further, the setting value of transfer current, which is increased before the leading end of the sheet 3 enters the fixing nip 27, may be maintained until the trailing end of the sheet 3 exits the transfer nip 24.

Figure 7:
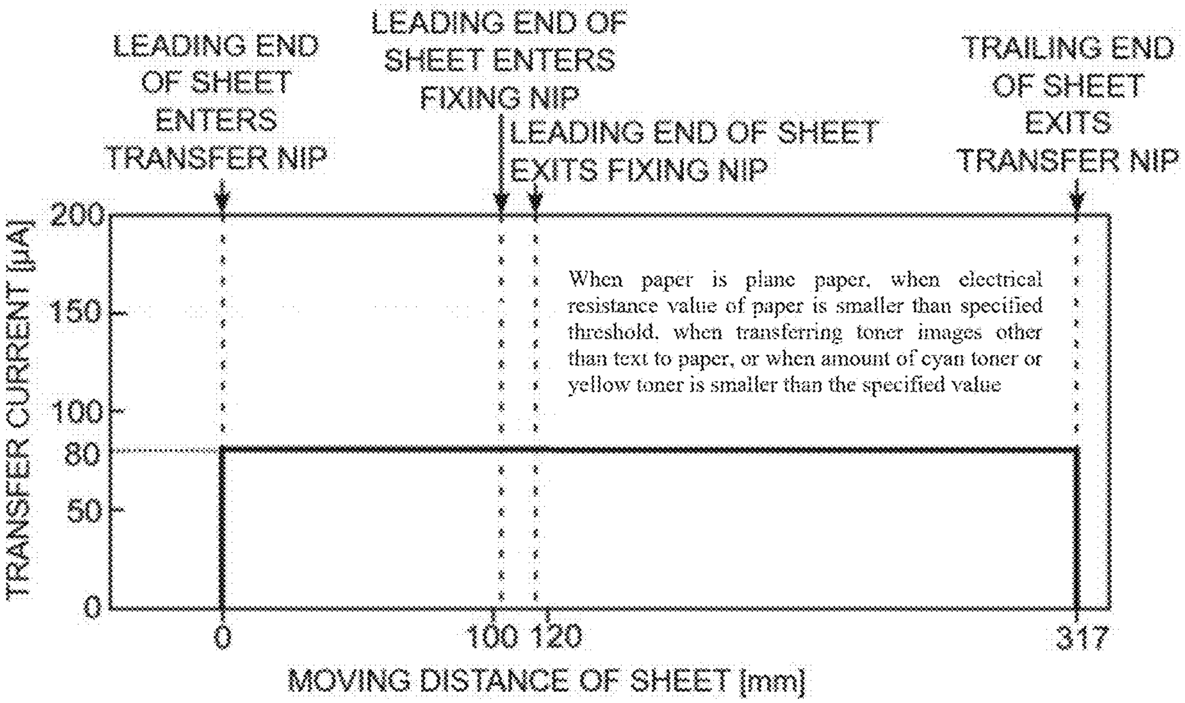
FIG. 7 is a graph illustrating a change in a setting value of transfer current.

The controller 7 may be provided in such a way as to determine whether to increase the setting value of transfer current after the leading end of the sheet 3 passes through the transfer nip 24 and before the leading end of the sheet 3 passes through the fixing nip 27, based on a type of the sheet 3 passing through the transfer nip 24. The controller 7 can determine the type of the sheet 3, based on, for example, print settings to be set by a user, or a sheet feeding tray to be used. In a case where the controller 7 determines that the sheet 3 is plain paper, as illustrated in the graph of FIG. 7, the controller 7 can make the setting value of transfer current constant at the normal value, while the sheet 3 passes through the transfer nip 24. In a case where the controller 7 determines that the sheet 3 is thick paper, as illustrated in the graph shown in FIG. 3 or FIG. 4, the controller 7 can increase the setting value of transfer current from the normal value after the leading end of the sheet 3 passes through the transfer nip 24 and before the leading end of the sheet 3 passes through the fixing nip 27.

The controller 7 may be provided in such a way as to determine whether to increase the setting value of transfer current from the normal value after the leading end the sheet 3 passes through the transfer nip 24 and before the leading end of the sheet 3 passes through the fixing nip 27, based on an electrical resistance value (penetrating electrical resistance value) between a front surface and a back surface of the sheet 3. The controller 7 can determine the penetrating electric resistance value of the sheet 3, based on, for example, print settings to be set by a user, or a sheet feeding tray to be used. In this case, the controller 7 may store a penetrating electric resistance value of the sheet 3 that is measured in advance. FIG. 3, or FIG. 4, shows control of a transfer current performed by the controller 7 when the penetrating electric resistance value of the sheet 3 is larger than a predetermined threshold value, and FIG. 7 shows control of a transfer current performed by the controller 7 when the penetrating electric resistance value of the sheet 3 is smaller than the predetermined threshold value. For example, in a case where the penetrating electric resistance value of the sheet is smaller than the predetermined threshold value, as illustrated in the graph of FIG. 7, the controller 7 can make the setting value of transfer current constant at a normal value, while the sheet 3 passes through the transfer nip 24. Further, when the penetrating electric resistance value of the sheet is larger than the predetermined threshold value, as illustrated in the graph shown in FIG. 3 or FIG. 4, the controller 7 can increase the setting value of transfer current from the normal value after the leading end of the sheet 3 passes through the transfer nip 24 and before the leading end of the sheet 3 passes through the fixing nip 27.

In a case where the penetrating electrical resistance value of the sheet 3 is large, since electric field strength of a secondary transfer electric field to be formed in the transfer nip 24 during passing of the sheet may decrease, it is possible to suppress deterioration in image quality by increasing the setting value of transfer current while the leading end of the sheet 3 passes through the fixing nip 27.

The image forming apparatus 50 may include a sensor section provided in such a way as to measure an electrical resistance value between a front surface and a back surface of the sheet 3. The sensor section can include, for example, two conductive rollers provided in such a way as to sandwich the sheet transport path 2, and a measurement portion provided in such a way as to measure an electrical resistance value of the sheet 3 passing between the two conductive rollers. The controller 7 may be provided in such a way as to determine whether to increase the setting value of transfer current from the normal value after the leading end of the sheet 3 passes through the transfer nip 24 and before the leading end of the sheet 3 passes through the fixing nip 27, based on the electrical resistance value measured by the sensor section. FIG. 3, or FIG. 4, shows control of a transfer current performed by the controller 7 when an electrical resistance value of the sheet 3 is larger than a predetermined threshold value, and FIG. 7 shows control of a transfer current performed by the controller 7 when the electrical resistance value of the sheet 3 is smaller than the predetermined threshold value. For example, in a case where an electrical resistance value measured by the sensor section is smaller than the predetermined threshold value, as illustrated in the graph of FIG. 7, the controller 7 can make the setting value of transfer current constant at a normal value, while the sheet 3 passes through the transfer nip 24. Further, in a case where an electric resistance value is larger than the predetermined threshold value measured by the sensor, as illustrated in the graph shown in FIG. 3 or FIG. 4, the controller 7 can increase the setting value of transfer current from the normal value after the leading end of the sheet 3 passes through the transfer nip 24 and before the leading end of the sheet 3 passes through the fixing nip 27.

The controller 7 may be provided in such a way as to make the setting value of transfer current constant at a normal value, as illustrated in the graph of FIG. 7, while the sheet 3 passes through the transfer nip 24, when a toner image being a text is transferred onto the sheet 3 in the transfer nip 24 at timing when the leading end of the sheet 3 passes through the fixing nip 27. Further, the controller 7 may be provided in such a way as to increase the setting value of transfer current from the normal value after the leading end of the sheet 3 passes through the transfer nip 24 and before the leading end of the sheet 3 passes through the fixing nip 27, as illustrated in the graph of FIG. 3 or FIG. 4, when a toner image being an image (e.g., a solid image) is transferred onto the sheet 3 in the transfer nip 24 at timing when the leading end of the sheet 3 passes through the fixing nip 27. FIG. 3, or FIG. 4, shows control of a transfer current performed by the controller 7 when the toner image other than text is transferred onto the sheet 3, and FIG. 7 shows control of a transfer current performed by the controller 7 when a toner image being a text is transferred onto the sheet 3. Since image quality is likely to be deteriorated in an image, as compared with a text due to an impact caused when the leading end of the sheet 3 enters the fixing nip 27, it is possible to suppress deterioration in image quality by increasing the setting value of transfer current from the normal value when the image is printed.

The controller 7 may be provided to increase the setting value of transfer current from a normal value after the leading end of the sheet 3 passes through the transfer nip 24 and before the leading end of the sheet 3 passes through the fixing nip 27, as illustrated in the graph of FIG. 3 or FIG. 4, when an amount of cyan toner or yellow toner contained in a toner image to be transferred onto the sheet 3 is larger than a predetermined value in the transfer nip 24 at timing when the leading end of the sheet 3 passes through the fixing nip 27; and make the setting value of transfer current constant at the normal value, while the sheet 3 passes through the transfer nip 24, as illustrated in the graph of FIG. 7, when the amount of cyan toner or yellow toner is smaller than the predetermined value. FIG. 3, or FIG. 4, shows control of a transfer current performed by the controller 7 when an amount of cyan toner or yellow toner contained in the toner image to be transferred onto the sheet 3 is larger than a predetermined value, and FIG. 7 shows control of a transfer current performed by the controller 7 when the amount of cyan toner or yellow toner is smaller than the predetermined value. Since image quality is likely to be deteriorated in an image in which an amount of cyan toner or yellow toner is large due to an impact caused when the leading end of the sheet 3 enters the fixing nip 27, it is possible to suppress deterioration in image quality by increasing the setting value of transfer current from the normal value, when the image in which the amount of cyan toner or yellow toner is large is printed.

The controller 7 may be provided in such a way as to adjust an amount of increase in the setting value of transfer current from the normal value, based on a type of the sheet 3 passing through the transfer nip 24, an electrical resistance value (penetrating electrical resistance value) between a front surface and a back surface of the sheet 3, or an amount of cyan toner or yellow toner contained in a toner image to be transferred onto the sheet 3 in the transfer nip 24 at timing when the leading end of the sheet 3 passes through the fixing nip 27. For example, when printing is performed on the sheet 3 which is likely to cause deterioration in image quality, when printing is performed on the sheet 3 having a particularly large penetrating electrical resistance value, when an image having a large amount of cyan toner is printed, or the like, as illustrated in the graph in FIG. 5, the amount of increase in the setting value of transfer current from the normal value can be made larger (100 μA) than the normal value (FIG. 4 (70 μA)). In addition, for example, when printing is performed on the sheet 3 which is relatively unlikely to cause deterioration in image quality, when printing is performed on the sheet 3 having a relatively small penetrating electrical resistance value, when an image having a large amount of yellow toner is printed, or the like, as illustrated in the graph in FIG. 6, the amount of increase in the setting value of transfer current from the normal value can be made smaller (40 μA) than the normal value (FIG. 4 (70 μA)).

Blue Solid Image Printing

A blue image was printed on an A4 size sheet having a basis weight of 360 $g/m^2$ by using a digital full color multifunction peripheral manufactured by Sharp Corporation. In the printing as an example, as illustrated in the graph in FIG. 3, the setting value of transfer current was changed by a controller. In the printing as a comparative example, the setting value of transfer current was made constant at 80 μA.

In the printed image of the comparative example, a light and shade stripe (banding) of toner appeared in a portion where transfer was performed in the transfer nip at timing when the leading end of the sheet passed through the fixer. In the printed image of the example, a light and shade stripe (banding) of toner which appeared in the comparative example did not appear. Therefore, it has been found that deterioration in image quality can be suppressed by increasing the setting value of transfer current when the leading end of the sheet passes through the fixer.

What is claimed is:

1. An image forming apparatus comprising:

a transferer provided to transfer a toner image, that is on an image carrier, onto a sheet, the transferer facing the image carrier;

a fixer provided to fix the toner image on the sheet; and a controller provided to apply a transfer voltage for transferring the toner image onto the sheet, wherein:

the transferer is provided to define a transfer nip between the image carrier and the transferer for passing the sheet, the fixer includes a heating portion and a pressing portion, and is provided to pass the sheet that has passed through the transfer nip through a fixing nip between the heating portion and the pressing portion, and the controller is provided to:

control the transfer voltage in such a way that a setting value of transfer current flowing through the transfer nip is made constant at a normal value, increase the setting value of transfer current beyond the normal value after a leading end of the sheet enters the transfer nip and immediately before the leading end of the sheet enters the fixing nip, enter the leading end of the sheet into the fixing nip with increasing the setting value of transfer current beyond the normal value, maintain the setting value of transfer current increased beyond the normal value until the leading end of the sheet exits the fixing nip, and decrease the setting value of transfer current to the normal value after the leading end of the sheet exits the fixing nip and before a trailing end of the sheet exits the transfer nip.

2. The image forming apparatus according to claim 1, wherein a transport distance of the sheet from an increase in the setting value of transfer current to a decrease in the setting value of transfer current is 13 mm or more and 30 mm or less.

3. The image forming apparatus according to claim 1, wherein the controller is further provided to determine whether to increase the setting value of transfer current after the leading end of the sheet enters the transfer nip and immediately before the leading end of the sheet enters the fixing nip based on a type of the sheet passing through the transfer nip.

4. The image forming apparatus according to claim 3, wherein in a case that the sheet is a plain paper, the controller is further provided to make the setting value of transfer current constant while the sheet passes through the transfer nip, and in a case that the sheet is a thick paper, the controller is provided to increase the setting value of transfer current after the leading end of the sheet enters the transfer nip and immediately before the leading end of the sheet enters the fixing nip.

5. The image forming apparatus according to claim 1, wherein the controller is further provided to determine whether to increase the setting value of transfer current after the leading end of the sheet enters the transfer nip and immediately before the leading end of the sheet enters the fixing nip based on an electrical resistance value between a front surface and a back surface of the sheet.

6. The image forming apparatus according to claim 1, further comprising:

a sensor section provided to measure an electrical resistance value between a front surface and a back surface of the sheet, wherein the controller is further provided to determine whether to increase the setting value of transfer current after the leading end of the sheet enters the transfer nip and immediately before the leading end of the sheet enters the fixing nip based on the electrical resistance value measured by the sensor section.

7. The image forming apparatus according to claim 1, wherein the controller is further provided to:

make the setting value of transfer current constant while the sheet passes through the transfer nip in a case that a toner image being a text is transferred onto the sheet in the transfer nip at a time when the leading end of the sheet enters the fixing nip, and increase the setting value of transfer current after the leading end of the sheet enters the transfer nip and immediately before the leading end of the sheet enters the fixing nip in a case that a toner image other than the text is transferred onto the sheet in the transfer nip at a time when the leading end of the sheet enters the fixing nip.

8. The image forming apparatus according to claim 1, wherein the controller is provided to increase the setting value of transfer current after the leading end of the sheet enters the transfer nip and immediately before the leading end of the sheet enters the fixing nip in a case that an amount of cyan toner or yellow toner contained in the toner image to be transferred onto the sheet in the transfer nip is larger than a predetermined value at a time when the leading end of the sheet enters the fixing nip.

9. The image forming apparatus according to claim 1, wherein the controller is further provided to adjust, based on a type of the sheet passing through the transfer nip, an amount of the increase in the setting value of transfer current, an electrical resistance value between a front surface and a back surface of the sheet, or an amount of cyan toner or yellow toner contained in the toner image to be transferred onto the sheet in the transfer nip at a time when the leading end of the sheet enters the fixing nip.

* * * * *